(12) United States Patent
Yasui et al.

(10) Patent No.: US 7,542,229 B2
(45) Date of Patent: Jun. 2, 2009

(54) MAGNETIC RECORDING-REPRODUCING APPARATUS

(75) Inventors: Nobuhiro Yasui, Kawasaki (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/960,182

(22) Filed: Dec. 19, 2007

(65) Prior Publication Data

US 2008/0151410 A1 Jun. 26, 2008

(30) Foreign Application Priority Data

Dec. 22, 2006 (JP) ............................. 2006-345893

(51) Int. Cl.
*G11B 21/02* (2006.01)
*G11B 5/596* (2006.01)

(52) U.S. Cl. ..................... 360/75; 360/77.02; 360/77.08

(58) Field of Classification Search ........................ None
See application file for complete search history.

(56) References Cited

U.S. PATENT DOCUMENTS

| 6,791,797 | B2 | 9/2004 | Saito et al. ............... 360/136 |
| 6,852,431 | B2 | 2/2005 | Fukutani et al. ......... 428/694 R |
| 7,212,374 | B1* | 5/2007 | Wang et al. ............... 360/78.14 |
| 7,339,761 | B1* | 3/2008 | Tu et al. ................... 360/77.08 |
| 2002/0109933 | A1* | 8/2002 | Ashikaga et al. ......... 360/77.04 |
| 2006/0040118 | A1 | 2/2006 | Yasui et al. .................. 428/469 |
| 2006/0144812 | A1 | 7/2006 | Imada et al. ................... 216/22 |
| 2006/0222905 | A1 | 10/2006 | Yasui et al. .................. 428/836 |
| 2006/0280862 | A1 | 12/2006 | Yasui et al. .................. 427/127 |

FOREIGN PATENT DOCUMENTS

JP 3704105 7/2005

* cited by examiner

*Primary Examiner*—Andrew L Sniezek
(74) *Attorney, Agent, or Firm*—Fitzpatrick, Cella, Harper & Scinto (57) ABSTRACT

A magnetic recording-reproducing apparatus for recording or reproducing information on or from a magnetic recording medium constituted of plural recording areas containing sectors joined together, comprises a memorizing unit for memorizing information on positional deviation of the sectors at the boundary between adjacent recording areas, and a controlling unit for controlling movement of a magnetic recording head in accordance with the information on positional deviation in the memorizing unit when the magnetic recording head moves between the sectors at the boundary between adjacent recording areas.

3 Claims, 6 Drawing Sheets

MAGNETIC RECORDING-REPRODUCING APPARATUS

BACKGROUND OF THE INVENTION

1. Field of the Invention

The present invention relates to a magnetic recording-reproducing apparatus for recording information on a magnetic recording medium or reproducing the recorded information.

2. Description of the Related Art

With the demand for miniaturization and a larger memory capacity of information-processing equipment, the hard disk drives are miniaturized and the recording capacities are increased remarkably. For further increase of the recording density, another novel system for recording and reproducing information is expected.

To cancel an adverse effect of heat fluctuation resulting from micronization of a recording bit, a change is expected from the current system of recording one bit on plural magnetic particles to a novel system employing a patterned medium for recording one bit on a single magnetic particle.

The change to the patterned medium causes problems. In particular, the patterned medium should have the magnetic particles arranged in a regular pattern. In an intended square arrangement of 1 Tb/in$^2$ the magnetic particles are arranged at intervals of 25 nm. Such a medium cannot readily be produced. Moreover, the access with a recording head to the respective magnetic particles cannot readily be achieved.

To solve the former problem, in one method, an intended pattern is formed preliminarily on a mold, and the pattern is imprinted onto a medium for the regular arrangement. To solve the latter problem, a method is disclosed in which recording cell groups containing respectively plural magnetic particles are employed for the information recording and tracking, since the formation of a servo-pattern with fine magnetic particles is difficult (Japanese Patent No. 3704105).

In the above methods of preparation and tracking of the magnetic recording medium, a perfect arrangement is assumed without consideration of positional deviation in the arrangement. In particular, whether the medium is prepared by direct imprinting or by lithography by light exposure or electron beam, a perfect pattern cannot readily be formed over the entire of the medium having a diameter of one inch or more.

As described above, a perfect pattern cannot practically be formed on an area having a diameter of as large as one inch. To meet this difficulty, the entire pattern may be formed by joining plural perfect pattern sections. However, discontinuity can occur at the boundary between the joined sections. The discontinuity between the joined sections renders ineffective the preliminary formation of a pattern of servo-information or the regular arrangement for the tracking.

The present invention provides a magnetic recording-reproducing apparatus which enables tracking even when irregularity is caused between the joined sections of the magnetic recording medium.

SUMMARY OF THE INVENTION

The present invention is directed to a magnetic recording-reproducing apparatus for recording or reproducing information on or from a magnetic recording medium constituted of plural recording areas containing sectors joined together, comprising: a memorizing unit for memorizing information on positional deviation of the sectors at the boundary between adjacent recording areas, and a controlling unit for controlling movement of a magnetic recording head in accordance with the information on positional deviation in the memorizing unit when the magnetic recording head moves between the sectors at the boundary between adjacent recording areas.

The information on positional deviation can includes: a deviation $\delta$ in a direction perpendicular to a relative velocity vector of the magnetic head to the magnetic recording medium at the rear end sector of the recording area and parallel to the face of the magnetic recording medium, a deviation $\gamma$ in a direction parallel to the relative velocity vector of the magnetic head at the rear end sector of the recording area and parallel to the face of the magnetic recording medium, an angle $\psi$ between the relative velocity vector at the rear end sector of the recording area and a relative velocity vector at a first front end sector of a recording area adjacent to the recording area when the origins of the relative velocity vectors are superposed by parallel shift, and a deviation $\eta$ which is a difference in magnitude between the relative velocity vector at the rear end sector of the recording area and a relative velocity vector at a second front end sector of the adjacent recording area. The magnetic head can be moved in the direction of the radius of the magnetic recording medium by a predetermined pitch from the sector on the innermost circumference or the outermost circumference, information on positions of sectors of which the sector address can be read at the respective radius position, and the information on the positional deviations are calculated from the information on positions.

In the magnetic recording-reproducing apparatus, a sector arrangement can be set to minimize the drive range of the magnetic head in a cross-track direction in accordance with on the derived information on the positions, and the sector arrangement as address information is associated with the information on the positional deviation.

According to the present invention, the movement direction of the recording head is controlled to meet the deviation of the sectors at the boundaries between the adjacent recording areas in the magnetic recording medium to enable tracking of the medium regardless of the deviation of the sectors.

Further features of the present invention will become apparent from the following description of exemplary embodiments with reference to the attached drawings.

DESCRIPTION OF THE EMBODIMENTS

The best mode of the present invention is described below in detail by reference to drawings.

Figure 1:
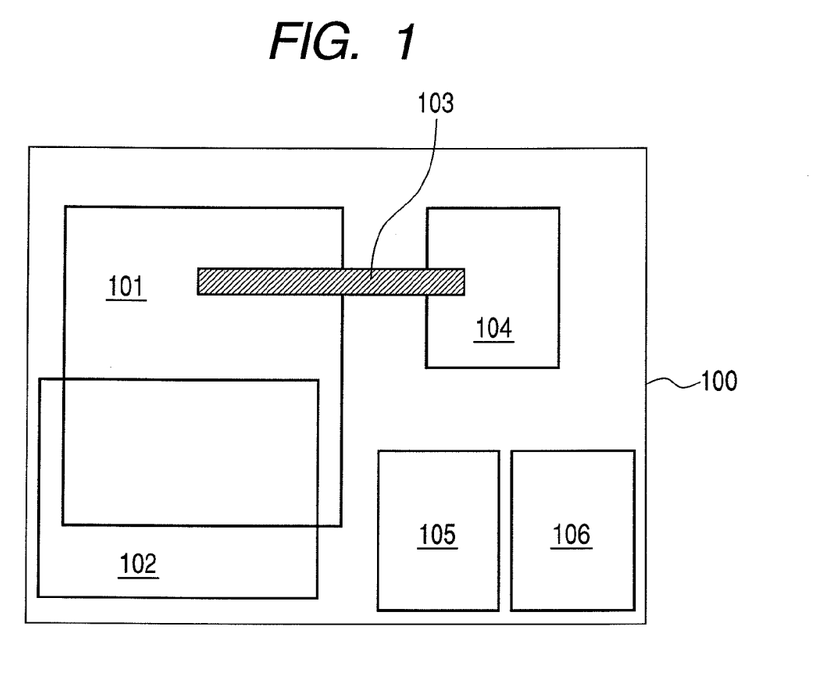
FIG. 1 illustrates schematically a constitution of an embodiment of the magnetic recording-reproducing apparatus of the present invention.

FIG. 1 illustrates schematically a constitution of an embodiment of the magnetic recording-reproducing apparatus of the present invention. In FIG. 1, casing 100 contains all of the constitution elements, including magnetic recording medium 101, recording medium-driving mechanism 102 for driving the magnetic recording medium, magnetic head 103 for recording information into magnetic recording medium 101 or reproducing the information, and head-driving mechanism 104 for driving magnetic head 103. Magnetic head 103 driven by head-driving mechanism 104 moves around an axis (not illustrated in the drawing) and is capable of accessing the tracks in the range from the innermost circumference to the outermost circumference of magnetic recording medium 101.

Arithmetic processing unit 105 calculates the driving direction and so forth of magnetic recording head 103 in the movement across the boundary between the sectors of the adjacent recording areas. Memory unit 106 memorizes the deviations of the sectors at the boundary between the adjacent recording areas. The deviation of the sectors, and the method of driving the magnetic head at the boundary between the sectors of the adjacent recording areas are described later in detail.

In FIG. 1, are omitted the circuit for recording information in magnetic recording medium 101, the circuit for reproducing the information, circuits for controlling the tracking, and the circuit for detecting the sector addresses. Further, in the drawing, control circuits and mechanisms for controlling the respective units are omitted since they are well known.

In the present invention, the information on the positional deviation in the regular pattern in magnetic recording medium 101 is stored preliminarily in memory unit 106. Arithmetic processing unit 105 conducts arithmetic operation regarding the driving direction and other conditions for driving the magnetic head in crossing the boundary between the recording sectors to meet the positional deviation. In practical driving of the recording head in recording of information on magnetic head 103 or reproduction thereof, head-driving mechanism 104 is controlled according to the result of the arithmetic operation to enable tracking of magnetic recording medium 101 containing undesired positional deviations in the regular pattern region.

The layout of the constitutional elements in the magnetic recording medium is not limited to the one illustrated in FIG. 1, provided that the constitutional elements fulfill respectively their functions. Magnetic recording medium 101 is in a conventional disk shape, and recording and reproduction are conducted by magnetic head 103 on rotating magnetic recording medium 101. Otherwise, magnetic recording medium 101 may be a flat rectangular plate having linear tracks, and recording and reproduction may be conducted by relative scanning with magnetic head 103.

Next, the cause of the relative positional deviation of the recording areas is described below.

The patterned magnetic recording medium can be formed in various processes. In any of the processes, regular pattern should be essentially formed in a step of the process. In the actual production, the pattern is imprinted on the medium with a mold having the same size as that of the medium, and a magnetic film is laminated thereon.

For the process, the imprinting mold is necessary which has a size equal to that of the magnetic recording medium, typically one inch in diameter. The imprinting mold should have a perfect pattern thereon.

For example, for one-inch disk, a fan-shaped mold of a central angle of 45 degrees is assumed to be formed as a perfect mold at an acceptance probability of 50% in two weeks. In this case, the preparation of one-inch full size of the medium requires eight-times the two weeks, namely 16 weeks, at the probability of eighth-power of 0.5: the acceptance probability of the perfect mold production being as low as about 0.39. This is impractical.

Therefore, for shortening the mold production time, a fan-shaped mold having a central angle of 45 degrees having a perfect pattern is formed in two-weeks; the pattern of the formed fan-shaped mold is imprinted eight times; and the imprinted patterns are joined to form an entire mold. Otherwise, eight fan-shaped molds are formed separately by plural apparatuses, and a complete mold is produced by joining the fan-shaped molds.

This is possible since the fan-shaped mold has a sufficient enduring strength for repeated imprinting and the time for one imprinting is known. When the sector addresses are formed preliminarily, the molds are prepared for the positions to form the entire mold.

Figure 2A:
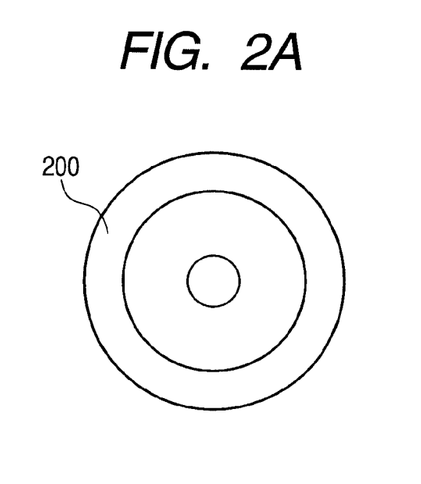
FIGS. 2A and 2B illustrate schematically a magnetic recording medium of the present invention.
Figure 2B:
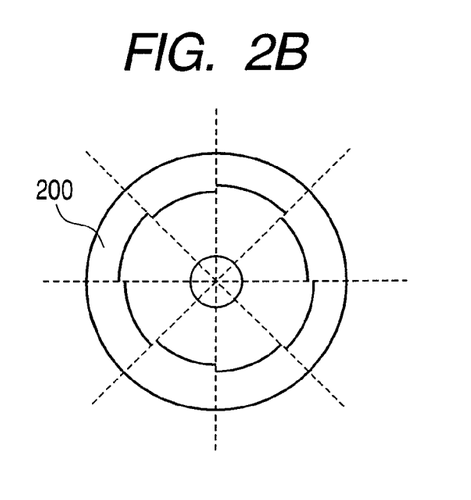

The full-size mold prepared by this method has a seam between the adjacent fan-shaped molds disadvantageously. FIG. 2B illustrates this schematically. When the medium is formed by imprinting with one full-size mold, the tracks can be formed in a state of one band 200 as illustrated in FIG. 2A.

In contrast, the joined mold has positional deviations in track 200 as shown in FIG. 2B. The present invention solves the problem caused by the deviations.

Figure 3A:
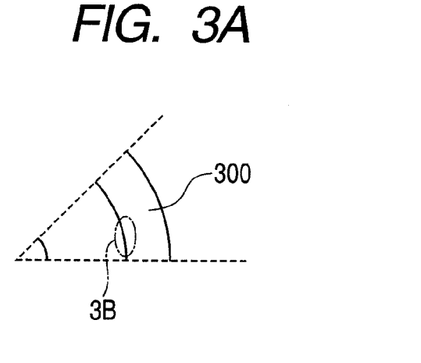
FIGS. 3A and 3B are drawings for describing the discontinuity in the tracks in the magnetic recording medium.
Figure 3B:
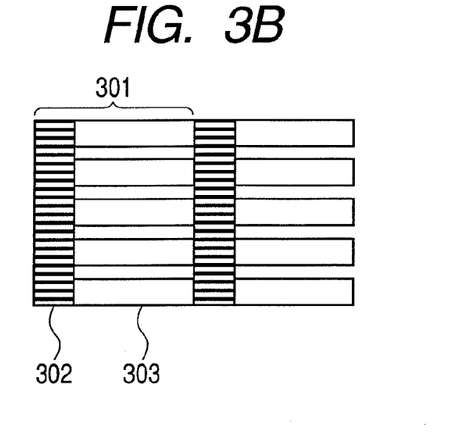

In a recoding medium prepared by use of the above-mentioned fan-shaped mold or the full-size mold produced from the fan-shaped mold, the portion corresponding to the fan-shaped area is called a recording area 300 as illustrated in FIGS. 3A and 3B. This area includes one or more sectors 301 as illustrated in FIGS. 3A and 3B. The respective sectors 301 are constituted of servo-mark region 302 and recording cell region 303 in which magnetic particles are arranged regularly.

Therefore, the magnetic recording medium of the present invention contains plural recording areas 300 as illustrated in FIG. 2B. The shape of the recording area 300 is not limited to fan-shaped as illustrated in FIGS. 2A and 2B. The recording areas 300 should cover the entire of the recording range. However, small gaps or deviations are allowable.

Figure 4:
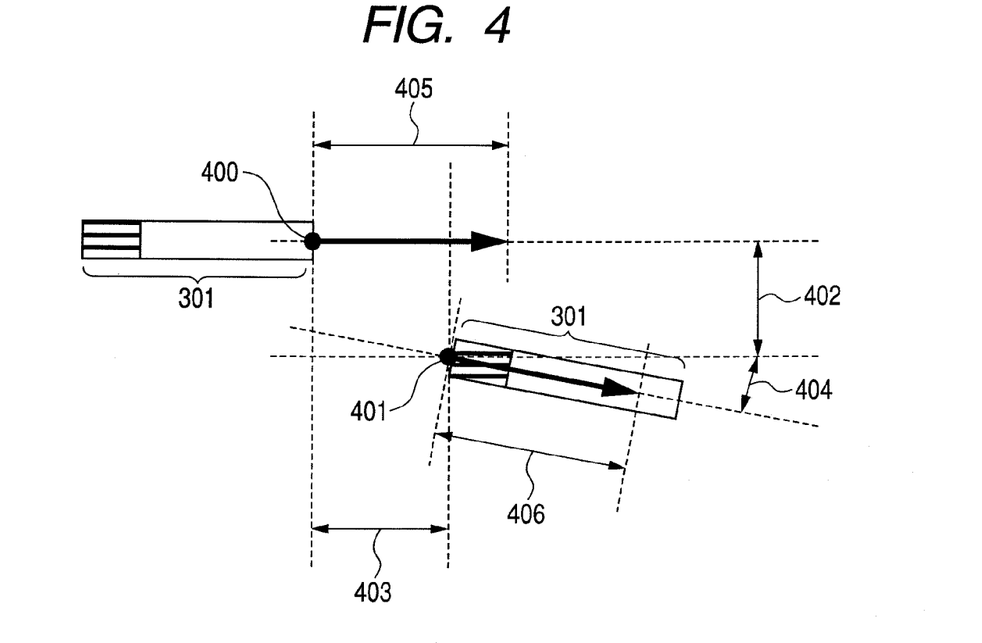
FIG. 4 is a drawing for describing the deviation of the sectors in the present invention.

Next, the positional difference between recording areas 300 is described below. Generally, the deviation is represented by use of vectors as illustrated in FIG. 4. FIG. 4 illustrates two sectors at the boundary between the recording areas. In the present invention, consideration is made about the deviation of relative velocity vector 400 of the recording head relative to the magnetic recording medium at the rear end portion of one sector 301 (hereinafter referred to as vector 1) from relative velocity vector 401 of the recording head relative to the magnetic recording medium at the front end of the adjacent sector to be tracked successively (hereinafter referred to as vector 2).

When sectors 301 are separated as illustrated in FIG. 4, a variable for representing the deviation is defined as below. In FIG. 4, the two sectors 301 are illustrated to be apart with a large deviation 402 ($\delta$) for ease of understanding. However, the deviation $\delta$ is not so large actually.

Deviation 402 ($\delta$)

Deviation 402 ($\delta$) is defined as the difference between vector 1 and vector 2 in the direction perpendicular to vector 1 at the rear end of a sector and parallel to the medium face as illustrated in FIG. 4. Since sectors 301 are juxtaposed compactly in the off-track direction, the adjacent sectors 301 are selected to be near to each other. Therefore, the deviation $\delta$ is not larger than half of the track pitch.

Deviation 403 (γ)

Deviation 403 (γ) is defined as the difference between vector 1 and vector 2 in the direction parallel to vector 1 at the rear end of a sector and parallel to the magnetic recording medium face as illustrated in FIG. 4. With the sectors overlapping with each other, the deviation is represented by a minus value, whereas with the sectors not overlapping, the deviation is represented by a plus value. When the deviation 403 (γ) is plus, the portion of the magnetic recording medium between the sectors is treated as a no-data state. Otherwise the no-data region may be utilized for the synchronizing signal for identifying a position in the magnetic recording medium when the recording head traverses the non-data region.

Deviation 404 (ψ)

Deviation 404 (ψ) is defined as an angle between vector 1 at the rear end of a sector and vector 2 at the front end of the next sector displaced parallel to superpose the two vector origins. In consideration of positional registration accuracy in imprinting on a one-inch substrate with an eight-fold symmetrical perfect mold, the recording areas can be joined at an accuracy of 0.005 degree or more accurate. Therefore, the angle of deviation 400 (ψ) is not more than 0.005 degree.

Deviation η

Deviation η is defined as the difference between magnitude 405 of vector 1 of the rear end of one sector and magnitude 406 of vector 2 at the front end of the next sector. With a rotating recording medium, deviation η depends on the radial position the sector and the rotation speed of the magnetic recording medium.

The variables representing the deviations are described above. The estimation of these variables enables a preliminary countermeasure against deviations which cannot be corrected successively by tracking.

Next, the procedure to estimate the deviations between the recording areas is described. In a magnetic recording medium constituted of plural recording areas 300, the sector arrangement is designed to track successively sectors 301 of the recording areas.

In this embodiment, for example, with an apparatus illustrated in FIG. 1, deviations between recording areas are measured during production of the magnetic recording medium with a magnetic recording medium fixed in the apparatus. The deviations are measured of the sectors of all adjacent recording areas, and are stored in a portion of the magnetic recording medium with sector address information on the recording areas.

In the storage of the deviation information, the deviations are made to correspond to the sector addresses in the recording areas with the above-mentioned sector arrangement. For instance, by reference to FIG. 5B as described later, the address of sector b in the sector arrangement information is associated with the deviation between sectors b and c: the address of sector d is associated with the deviations between sectors d and e. This sector arrangement is useful in sector control of the magnetic recording medium.

Specifically, firstly, a reference of recording area 300 is decided. On a certain sector 301 in this recording area, a magnetic head is brought into an on-track state. This sector 301 is selected as the reference point. For instance, this reference point is selected at the front sector in the innermost circumference.

In this state, the magnetic recording head is moved gradually to obtain data successively regarding the relation of the sector addresses identified by the recording head with the positions on the magnetic recording medium (distance in the radius direction and the rotation angle of the magnetic recording medium from the reference point). For instance, the magnetic recording medium is rotated, taking the front sector on the innermost circumference of a recording area as the reference point, and the sector address is decided at the radius position by the magnetic head. The sector address is detected from the output of the magnetic recording head by an address detection circuit (not shown in the drawing). The tracking is not conducted.

When addressing for one round of the magnetic recording medium has been completed, the magnetic head is shifted outward by a predetermined distance, and conducts addressing on the circle at that radius in the same manner. This addressing operation is conducted with stepwise outward shift of the recording head to the sectors on the outermost circumference to obtain readable sector addresses. Naturally, the addressing may be conducted reversely from the outermost sectors toward inside with stepwise shift of the recording head.

The sector addresses are contained in servo-mark region 302 as shown in FIGS. 3A and 3B. In this example, magnetic head 103 is preferably shifted by a step of 1/10 times the breadth of the track.

Figure 5A:
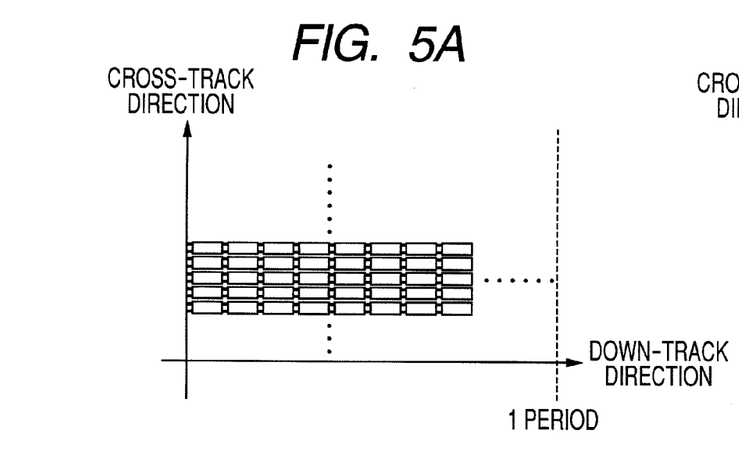
FIGS. 5A, 5B and 5C illustrate the deviations in the present invention.
Figure 5B:
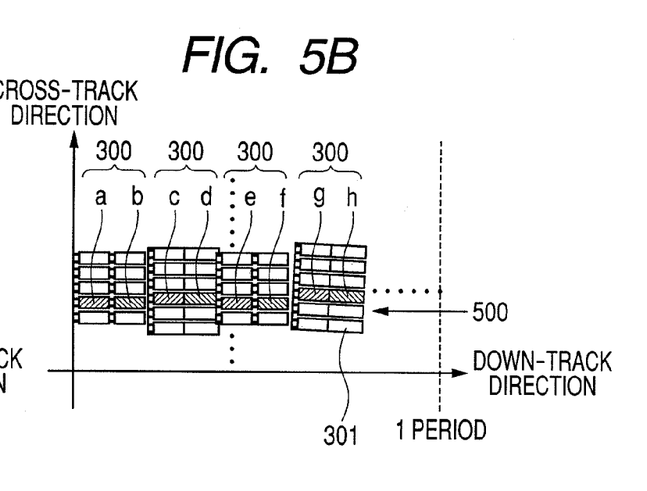

The above operation gives a map illustrated schematically in FIG. 5B. The map gives information for estimation of positional deviations δ, γ, ψ, and η between recording areas 300 (FIG. 4). Arithmetic processing unit 105 calculates the deviations from the obtained information. In FIG. 5B, sectors read by the above addressing are plotted: the lateral axis indicates the down-track direction and the vertical axis indicates the cross-track direction.

Figure 5C:
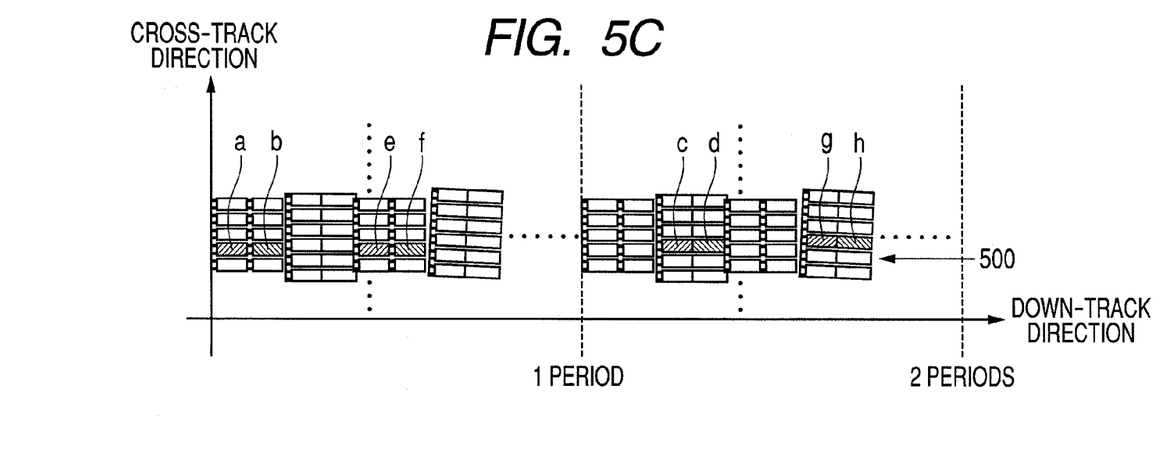

In FIG. 5B, the driving range of the magnetic head is minimum on the hatched sectors. There are positional deviations between the recording areas. However, tracking of these sectors is possible by the magnetic read-driving method of the present invention described later. In actual driving, recording and reproduction of information is conducted with this sector arrangement by controlling the magnetic head. In FIGS. 5A to 5C, one recording area contains sets of two sectors, but the number of the sectors is not limited thereto.

Next, the method of estimation of the deviations is descried below with reference of FIGS. 6A to 6C, 7A and 7B. As an example, the track pitch is assumed to be 50 nm and the rotation speed of the magnetic recording medium is assumed to be 6000 rpm. The deviations of the sectors on the adjacent recording areas on this recording medium is estimated at the position of 8 mm radius (FIG. 6B).

Figure 6A:
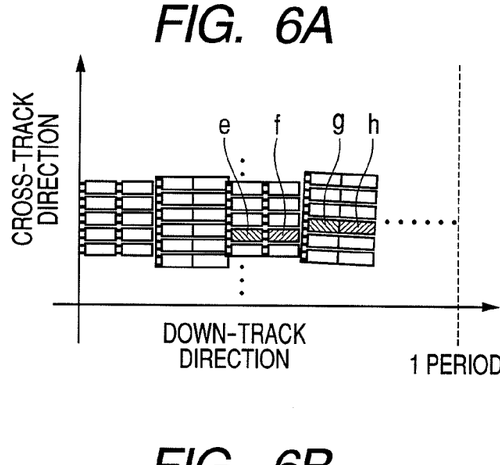
FIGS. 6A, 6B and 6C are drawings for explaining estimation of deviations $\delta$ and $\gamma$.
Figure 6B:
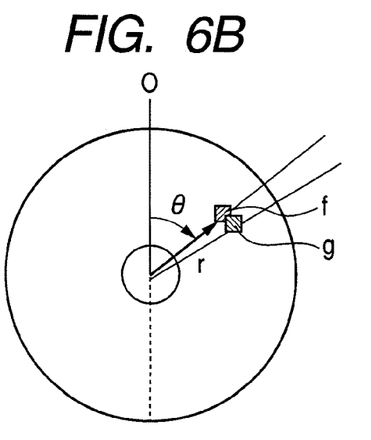

FIG. 6A is a sector map similar to that of FIG. 5B. The deviation of sector f from sector g is estimated. FIG. 6B illustrates schematically the positions of the sector f and the sector g on a magnetic recording medium (disk-shaped medium).

Figure 6C:
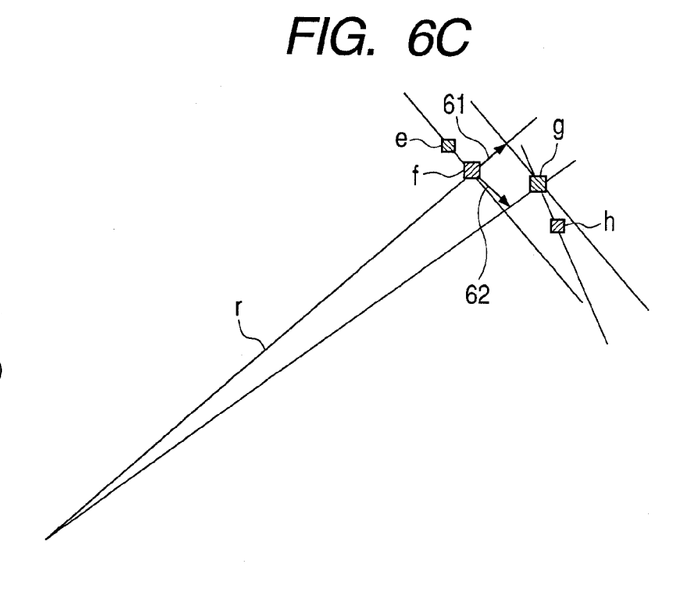

FIG. 6C illustrates coordinate positions of the sectors shown in FIG. 6A: the rear end of sector f, the front end of sector g, the rear end of sector e adjacent to sector f, and the front end of sector h adjacent to sector g. The relative positions of the sectors e and h are illustrated to be nearer than the actual positions.

The positions of the sectors are defined by the radius position (distance from the center) and the rotation angle from the reference position. Rotation angle θ is an angle from the reference position as illustrated in FIG. 6B, and can be converted to a corresponding time. For example, at a radius of 8 mm, and the rotation speed of 6000 rpm, the sector is moving at a rate of 5026.54816 mm/sec. Thus the angle corresponds to the flight time from the reference position.

Assuming the sector map of FIG. 6A, the sector f and the sector g are considered which are adjacent at a position of 8 mm radius on the magnetic recording medium. In this case, the rear end of sector f at the angle or 72 degrees deviates by 2 steps (one step: 5 nm) in the radius direction, and moving distance difference of 7.96 nsec, with reference to FIG. 6A, and the coordinates below are obtained as illustrated in FIG. 6C.

Coordinate of rear end of sector f (r:t)=(8.000000 mm: 2000000.00 nsec)

Coordinate of front end of sector g (r':t')=(8.000010 mm: 2000007.96 nsec)

Accordingly,

Deviation $\delta=r'-r=10$ nm

Deviation $\gamma$: flight time of 7.96 nsec (corresponding to 5026.548 (mm/sec)×7.96 nsec=40 nm)

Figure 7A:
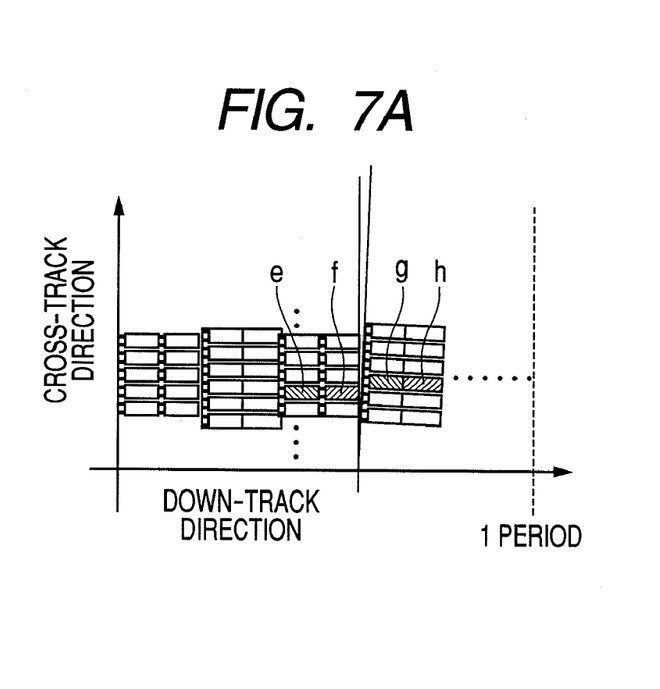
FIGS. 7A and 7B are drawings for explaining estimation of deviations $\psi$ and $\eta$.
Figure 7B:
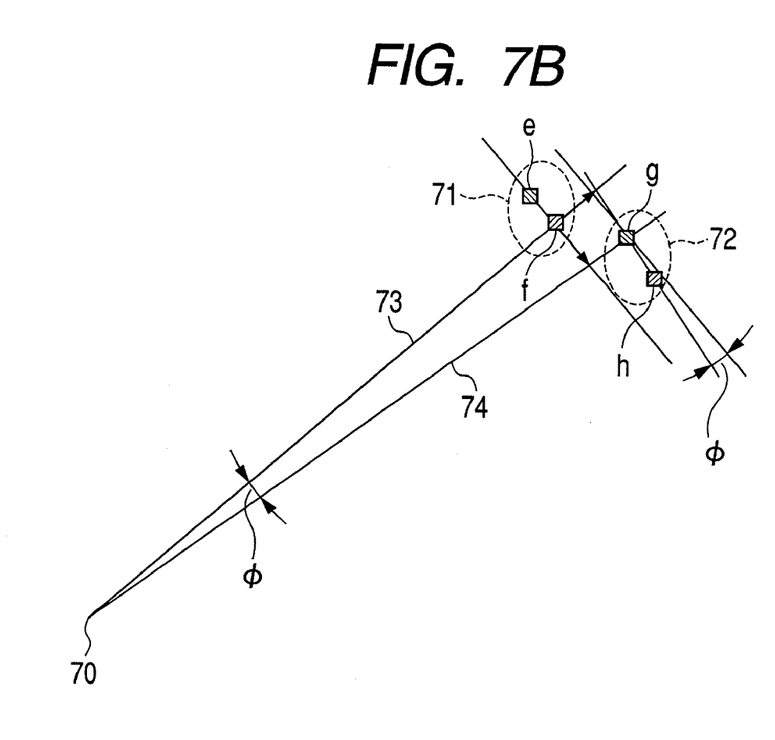

Next, deviations $\psi$ and $\eta$ are described with reference to FIGS. 7A and 7B. FIG. 7A is a sector map similar to that of FIG. 5B. FIG. 7B denotes coordinate positions of sector f and sector g similarly as in FIG. 6C, and denotes also the coordinate positions of sector e adjacent to sector f and sector h adjacent to sector g.

Deviation $\psi$ is described below. The angle between the rear end (sector rear end) of recording area 71 containing sector f and the front end (sector front end) of recording area 72 containing sector g is equal to the angle between the vector at the rear end of sector f and the vector at the front end of sector g. The former angle can be read from FIG. 7A. The lines 73 and 74 of the ends of the recording areas intersect at that angle at point 70 of the radius of 0 (zero) as illustrated in FIGS. 7A and 7B.

Therefore, from the radius of 8 mm, and deviation $\gamma=40$ nm, $\sin\psi=40$ nm/8 nm. $\therefore \psi=0.000286°$.

Deviation $\eta$ is described below. The speed of the sector at the radial position of 8.000000 mm is $2\times 8.000000$ mm×Π× 6000 rpm/60=5026.54816 mm/sec.

The velocity of sector g, which is at the radial position of 8.000010 mm from the center, is $2\times 8.000010$ mm×Π×6000 rpm/60=5026.55444 mm/sec. The deviation $\eta$ is the difference of the two velocities. $\therefore \eta=0.006283$ mm/sec.

Arithmetic processing unit 105 estimates, in such a manner, all of the deviations $\delta$, $\gamma$, $\psi$, and $\eta$ of the sectors at the boundaries of the adjacent recording areas. The derived deviations together with the sector arrangement are memorized as the deviation information in a predetermined region.

FIG. 5A illustrates schematically servo-marks and sector addresses written on a non-patterned magnetic recording medium, for comparison. On such a uniform medium, the deviation described in the present invention will not be caused in the arrangement.

In a magnetic recording medium employed in the present invention, from the information shown in FIG. 5B, information on sector arrangement 500 is provided to minimize the movement of the magnetic head. The formed sector arrangement 500 is constituted of sectors 301 on a so-called track.

In the present invention, the formation of one track need not be conducted in one round. The information on sector arrangement 500 may be provided by accessing all of sectors 301 in plural rounds.

For example, as shown in FIG. 5B, the information on the arrangement of sector 500 is provided in one round in the order of a→b→c→d→e→f→g→h→ .... Otherwise, the information may be provided, as shown in FIG. 5C, in two rounds in the order of a→b→e→f→ ... c→d→g→h→ ....

In FIG. 5C, when the deviation of sectors b from sector c is large and the tracking from sector b to sector c cannot be conducted smoothly in the first round, the tracking from sector b to sector c may be conducted in the second round. In this case, the information on the tracking order is held in addition to the above sector arrangement information, and the tracking is conducted according to the information.

The adjacent recording areas 300 may deviate from each other to cause a plus value (+) of deviation 403 ($\gamma$) (no overlapping of sectors) or a minus value (−) thereof (overlapping of sectors). The minus deviation can be detected on formation of the map of FIG. 5B, and the length of the apparently shortened sector length can be determined.

Next, the control of the magnetic head is described in movement to cross the boundary of sectors in the recording areas. The direction of driving of the magnetic head is controlled to meet the deviation.

An example of the control of movement of the magnetic head is described in moving between sector f and sector g at the boundary of the recording areas as illustrated in FIGS. 6A to 6C and FIGS. 7A to 7B. In this example, the deviations are assumed, as described above, to be deviation $\delta=10$ nm (flight time: 7.96 nsec), deviation $\gamma=40$ nm, deviation $\psi=0.000286°$, and deviation $\eta=0.0006283$ mm/sec.

In the present invention, when the magnetic head is going to cross the boundary of the sectors of the adjacent recording areas deviating from each other, the drive of the magnetic head is corrected to meet the deviation of the sectors. This correction is made by head-driving mechanism 104 controlled by a magnetic head-control unit (not shown in the drawing).

For example, the magnetic head is assumed to be placed at the rear end of sector f at the coordinate of ($\gamma$: t)=(8.000000 mm: 2000000.00 nsec). This magnetic head is to be moved to the front end of sector g of the next recording area at the coordinate (γ':t')=(8.000010 mm: 2000007.96 nsec).

In this example, head-driving mechanism 104 is controlled by a magnetic head-controlling circuit (not shown in the drawing), and magnetic head 103 is displaced 10 nm in 7.96 nsec in the radius direction of recording medium 101. Incidentally, in the control of the magnetic head, the deviation $\delta=10$ nm, and deviation $\gamma$ corresponds to the flight time of 7.96 nsec as mentioned above.

At the moment after crossing the boundary, the magnetic head is controlled to meet deviation $\psi=0.000286°$ and deviation $\eta=0.006283$ mm/sec. That is, the drive direction of the magnetic head is shifted in the recording area containing sector g. In this example, the driving direction of the magnetic head is the same as that in the recording area containing sector f, since the direction of deviation $\psi=0.000286°$ for deviation $\gamma=40$ nm coincides completely with the circumferential direction of the magnetic recording medium.

Specifically, when angle $\psi$ is equal to $\sin^{-1}(\gamma/r)$, the direction is the same as the circumferential direction, whereas when $\psi-\sin^{-1}(\gamma/r)$ is not zero substantially, the magnetic head is driven in the direction of the angle $\psi-\sin^{-1}(\gamma/r)$ from the circumferential direction. Thereby, velocity vector 2 is demodulated from the coordinate of vector 1 and $\eta$ to obtain $2\Pi r\times(\text{rpm}/60)$ mm/sec+$\eta$.

Further, the sectors in a line in the recording area having vector 2 is tracked successively in the direction of $\psi-\sin^{-1}(\gamma/r)$ in a usual manner. Thereafter, similarly in the movement of the magnetic head across the boundary between the sectors of the adjacent recording areas, the magnetic head is controlled by the magnetic head-controlling unit to meet the deviations between the adjacent sectors.

The present invention solves the problems in the pattern formation in a magnetic recording medium. Magnetic particles in the sector are arranged regularly along the sector: arranged in the circumferential direction in a rotating medium, and in the direction parallel to the medium driving direction in a medium of translational movement. Therefore, the above-mentioned problem is not caused in a conventional recording medium. In the conventional medium, when the medium has a defect, the defective sector is skipped, which is different from the corrected driving of the present invention.

As described above, even a patterned medium containing a deviation of sector arrangement can be tracked by controlling the magnetic head to meet the sector arrangement and the deviation. A magnetic recording apparatus employing the principle can be realized.

In the above description, the sector deviation is associated with the sector address by utilizing the sector arrangement information. However, the present invention is not limited to this embodiment. In the present invention, the entire of the sector arrangement information need not be completely known. But the deviation of the front end of the sector of a recording area from the rear end of the sector of an adjacent recording area is known.

Otherwise, the above-mentioned deviation caused between the recording areas may be determined in the magnetic recording medium production, and is recorded in a predetermined region of the magnetic recording medium. The user reads out the recorded deviation from the magnetic recording medium to the memory unit at turning-on of the power. In the apparatus of FIG. 1, the deviation information is read out from magnetic recording medium 101 to memory unit 106 at turning-on of the power.

Arithmetic processing unit 105 calculates the direction of driving of magnetic head 103, and so forth based on the deviation information, magnetic head-controlling unit controls magnetic head 103 based on the calculation results. Otherwise, the calculation results of arithmetic processing unit 105 may be memorized, and the magnetic head may be controlled in the following operation by using the calculation results.

Figure 8:
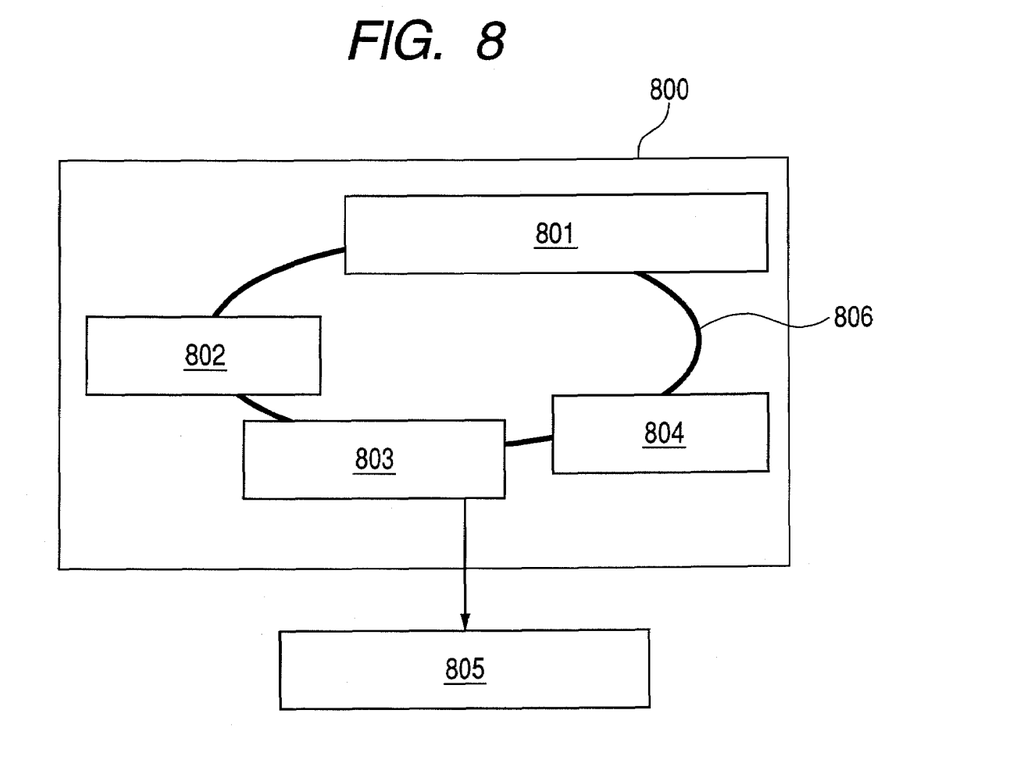
FIG. 8 illustrates schematically an information processing equipment employing the magnetic recording-reproducing apparatus of the present invention.

FIG. 8 illustrates schematically a constitution of an information-processing system employing a magnetic recording-reproduction apparatus of the present invention. This information processing system is comprised of magnetic recording-reproduction apparatus 801 of the present invention, memory unit 803, processing unit 802, power source 804, wiring 806 connecting the units enclosed in casing 800, and outside input-output unit 805. The wiring may be fixed lines or wireless, provided that wiring 806 is capable of communicating the information.

EXAMPLES

Examples of the present invention are described below.

Example 1

This Example describes determination of the deviations of $\delta$, $\gamma$, $\psi$, and $\eta$. A substrate of 1-inch is employed. A mold is prepared for forming indentation for a patterned medium by imprint on the substrate.

The mold is in a full size, formed from eight fan-shaped molds having a center angle of 45°. The pattern is transferred onto the 1-inch substrate, and magnetic film is formed thereon to obtain a patterned medium. The track formed has a track pitch of 50 nm. The data of the deviations of the adjacent recording areas are collected by rotating the medium at a rotation rate of 6000 rpm.

The collection of the data of the deviation is conducted with an apparatus having a constitution similar to that illustrated in FIG. 1. The operation therefor is described above in detail, so that description of the operation is omitted here. In this Example, since the track pitch on the medium is 50 nm, the magnetic head is shifted stepwise by 5 nm (step of 1/10 times the track width), starting from the innermost sector toward outside circumference. Thereby, from signals from the sector addresses at respective radius positions, the information on the positions of the sectors is collected.

By the above operation, a map illustrated schematically in FIG. 5B is obtained. Thereby the data are collected for calculating the deviations $\delta$, $\gamma$, $\psi$, and $\eta$ of the sectors on the boundaries between the recording areas. The method of calculation of the deviations is described above.

For instance, between the sectors at a radial position of 8 mm from the center of the medium, deviations for $\delta$=10 nm and 7.96 nsec are: $\gamma$=40 nm, $\psi$=0.000286°, and $\eta$=0.06283 mm/sec.

Example 2

This Example describes an arrangement of sectors which can be regarded to be on the same track. In the sector address map obtained in Example 1, the sectors are correlated with each other to make the deviation $\delta$ minimum between the adjacent recording areas. Thereby, the shadowed sectors in the schematic drawing of FIG. 5B are selected in the sector arrangement. In such a manner, the information on the sector arrangement and the information on the deviations can be obtained preliminarily.

Example 3

In this Example, a magnetic head is controlled according to the data, stored in a memory unit, on the deviations between recording areas. In the magnetic recording-reproducing apparatus illustrated in FIG. 1, the deviation information obtained in Example 1 is stored in memory unit 106. That is, the deviation information recorded in a region of the magnetic recording medium is read out and is memorized in memory unit 106. Simultaneously, sector arrangement information is also read out from the magnetic recording medium and is associated with the deviation information.

In actual driving operation, the movement of the magnetic head to cross the boundary of the adjacent sectors of the recording areas is controlled in accordance with the corresponding deviations. Arithmetic processing unit 105 calculates the movement direction of the magnetic head to meet the deviations. The practical method of control of the magnetic head is omitted here since it is described specifically above.

In the present invention, the deviations of the sectors may be converted preliminarily to variables for driving the magnetic head and the variables are stored in the memory unit. The magnetic head may be controlled based on the variables.

As described above, in a pattered magnetic recording medium, even in the presence of deviations in the medium, tracking can be practiced by controlling the magnetic head to meet the deviations as described above. A magnetic recording-reproduction apparatus can be constituted with above system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-345893, filed Dec. 22, 2006, which is hereby incorporated by reference herein in its entirety.

What is claimed is:

1. A magnetic recording-reproducing apparatus for recording or reproducing information on or from a magnetic recording medium constituted of plural recording areas containing sectors joined together, comprising:

a memorizing unit for memorizing positional deviation information of the sectors at a boundary between adjacent recording areas, and a controlling unit for controlling movement of a magnetic recording head in accordance with the positional deviation information in the memorizing unit when the magnetic recording head moves between the sectors at the boundary between adjacent recording areas, wherein the positional deviation information includes:

a deviation $\delta$ in a direction perpendicular to a relative velocity vector of the magnetic head to the magnetic recording medium at a rear end sector of the recording area and parallel to the face of the magnetic recording medium, a deviation $\gamma$ in a direction parallel to the relative velocity vector of the magnetic head at the rear end sector of the recording area and parallel to the face of the magnetic recording medium, an angle $\psi$ between the relative velocity vector at the rear end sector of the recording area and a relative velocity vector at a first front end sector of a recording area adjacent to the recording area when the origins of the relative velocity vectors are superposed by parallel shift, and a deviation $\eta$ which is a difference in magnitude between the relative velocity vector at the rear end sector of the recording area and a relative velocity vector at a second front end sector of the adjacent recording area.

2. The magnetic recording-reproduction apparatus according to claim 1, wherein the magnetic head is moved in a direction of the radius of the magnetic recording medium by a predetermined pitch from the sector on an innermost circumference or an outermost circumference, and wherein sector address information on positions of sectors can be read at the respective radius position, and the positional deviation information is calculated from the information on positions.

3. The magnetic recording-reproducing apparatus according to claim 1, wherein a sector arrangement is set to minimize the drive range of the magnetic head in a cross-track direction in accordance with on the derived information on the positions, and the sector arrangement as address information is associated with the positional deviation information.

* * * * *